(12) United States Patent
Andreis et al.

(10) Patent No.: US 6,855,400 B1
(45) Date of Patent: Feb. 15, 2005

(54) LOW PIGMENT CONTENT POLYESTER FILM AND PROCESS FOR MAKING THE SAME

(75) Inventors: Christine Andreis, Merzkirchen (DE); Gusty Feyder, Luxembourg (LU)

(73) Assignee: DuPont Teijin Films US Limited Partnership, Wilmington, DE (US)

( * ) Notice: Subject to any disclaimer, the term of this patent is extended or adjusted under 35 U.S.C. 154(b) by 0 days.

(21) Appl. No.: 09/600,621

(22) PCT Filed: Dec. 28, 1998

(86) PCT No.: PCT/EP98/08480

§ 371 (c)(1),
(2), (4) Date: Sep. 15, 2000

(87) PCT Pub. No.: WO99/37478

PCT Pub. Date: Jul. 29, 1999

(30) Foreign Application Priority Data

Jan. 20, 1998  (EP) .............................. 98400104

(51) Int. Cl.⁷ .............. B32B 3/00; B32B 5/16; B32B 7/02

(52) U.S. Cl. ............... 428/212; 428/213; 428/206; 428/207; 428/323; 428/339

(58) Field of Search ................. 428/213, 323, 428/206, 212, 324, 207, 339

(56) References Cited

U.S. PATENT DOCUMENTS

| | | | | | |
|---|---|---|---|---|---|
| 4,067,855 | A | * | 1/1978 | Miwa et al. | 260/75 R |
| 4,399,179 | A | * | 8/1983 | Minami et al. | 428/212 |
| 5,510,192 | A | * | 4/1996 | Utsumi et al. | 428/212 |
| 5,698,308 | A | * | 12/1997 | Sumiya et al. | 428/317.9 |
| 5,837,359 | A | * | 11/1998 | Shetty et al. | 359/577 |

* cited by examiner

Primary Examiner—Lawrence D. Ferguson

(57) ABSTRACT

The invention relates to a film comprising: (i) at least one polyester layer containing more than 10 wt % of a pigment, and (ii) at least one polyester layer substantially devoid of pigment, where the ratio of the respective thickness of the layer(s) devoid of pigment to the pigmented layer(s) is at least 1. The film shows good mechanical properties together with high opacity properties.

26 Claims, No Drawings

LOW PIGMENT CONTENT POLYESTER FILM AND PROCESS FOR MAKING THE SAME

TECHNICAL BACKGROUND OF THE INVENTION

The instant invention relates to a low pigment content polyester film, as well as to a process for making the same.

Pigments, especially white pigments, are known additives widely used to impart opacity or specific light transmission properties to films. However, there is currently no film designed for the sole purpose of containing (white) pigments, although there is a need for such films in applications where controlled haze, light transmission, opacity, etc., are desired final properties.

A film comprised of a mere layer containing pigment is not satisfactory, since the incorporation of fillers, especially pigments, although imparting valuable light transmission properties, presents the drawback of lowering the mechanical properties of the final film, compared to those of the host polymer prior to incorporation of the filler.

Films are widely known, and afford to combine various properties of different layers that are associated together. For example, films based on polyester are known.

JP-A-8290539 (to Diafoil Hoechst Co) discloses polyester films where the inner layer comprises fluorescent fine particles and the outer layer comprises white pigment. Said film is said to be adapted as a magnetic recording medium. The amount of white pigment is however very low.

Similarly, JP-A-8045067 (to Diafoil Hoechst Co) discloses polyester films where the inner layer comprises reclaimed raw material and the outer layer comprises white pigment. Said film is said to be adapted as a magnetic card on a pin ball game. The amount of white pigment is however very low.

JP-A-4110147 and JP-A-4110148 (to Diafoil Hoechst Co) disclose polyester films where one of the layers comprises a micropowder in an amount of from 0.1 to 5 wt %. The film has a highly delustered surface and is used for transfer moulding.

JP-A-6000859 (to Diafoil Hoechst Co) discloses polyester films where one of the layers comprises a micropowder in an amount of from 0.001 to 20 wt %, especially from 0.01 to 10 wt %. The film is said to be adapted as a magnetic recording medium, as well as a packing film, a matted film, etc. All examples make however use of very low amounts of the filler, typically about 1 wt %. Further, the process specified in said patent application is based (i) on extrusion-lamination; (ii) direct feeding with the result of the continuous polymerisation process and (iii) mixing of the filler or additive at the extruder level. This process does not make use of "chips" of polyester, and the feeding of the filler or additive at the extruder level makes it almost impossible to obtain a uniform dispersion of the filler or additive for high amounts, e.g. above 5 wt %.

Although films where one layer contains pigments are known from the above publications, it should be emphasized that these films have not been designed for the sole purposes of containing a white pigment. The problem faced when high amounts of pigments required for imparting high opacity are incorporated is that the mechanical properties of the final film are reduced. It is in fact well established that high opacity and high mechanical properties cannot be found in the same film. Further, it is also well established that high opacity requires high pigment content. Thus there is a need for a film that would show good mechanical properties together with good opacity properties, while minimizing the overall pigment content.

SUMMARY OF THE INVENTION

The invention thus provides such a film, in the form of a film comprising:
(i) at least one polyester layer containing more than 5 wt % of a pigment, and
(ii) at least one polyester layer substantially devoid of pigment,
where the ratio of the respective thickness of the layer(s) devoid of pigment to the pigmented layer(s) is at least 1.

The invention allows to combine the light transmission properties of a layer having a high pigment content together with the traditional mechanical properties of a layer substantially devoid of pigments.

DESCRIPTION OF EMBODIMENTS OF THE INVENTION

The polyester used in the invention is any polyester where the major part of it is comprised of any aromatic repeating ester units. The term polyester in this invention refers to a polymer that is obtained by condensation polymerization of an aromatic dicarboxylic acid such as terephthalic acid or 2,6-naphthalene dicarboxylic acid and of an aliphatic terephthalic acid glycol such as ethylene glycol, 1,4-butanediol or 1,4-cyclohexane dimethanol. These polymers, in addition to being homopolymers, may also be copolymers having a third component or several components. In this case, the dicarboxylic acid component may be, for example, isophthalic acid, phthalic acid, terephthalic acid, 2,6-naphthalene dicarboxylic acid, 4,4'-diphenyldicarboxylic acid, adipic acid, sebacic acid, decanedicarboxylic acid and 1,4-cyclohexane dicarboyxlic acid; the oxycarboxylic acid component can be, for example, p-oxybenzoic acid and the glycol component can be, for example, ethylene glycol, diethylene glycol, triethylene glycol, propylene glycol, butanediol, neopentyl glycol, 1,4-cyclohexane dimethanol, polyethylene glycol and polytetramethylene glycol. Examples of such polyesters are polyethylenenaphthalate (PEN), polybutyleneterephthalate (PBT), polyethyleneterephthalate (PET), the latter being the preferred polyester. Mixtures are also possible, optionally with another polymer different from a polyester. The intrinsic viscosity of the polyester that is used in the invention may vary from e.g. 0.45 to e.g. 0.7, measured in phenoltetrachloreethane at 30° C. The MW may vary within broad limits, e.g. between 10000 to 30000 g/mol.

Examples of pigments are $TiO_2$, $SiO_2$, $CaCO_3$, $Al_2O_3$, $BaSO_4$, carbon black, zeolite, kaolin, the preferred one being $TiO_2$. Mixtures are also possible. Preferably, the pigment is a white pigment. Voids can also be provided around the particles of pigment, as taught by EP-A-0688814. The pigment used can be the same or different in the pigmented layers, when more than one is used. The pigment has a particle size usually comprised between 0.01 and 5 $\mu$m, for example between 0.02 and 1.0 $\mu$m.

The following description is given with reference to PET and $TiO_2$ for the sake of convenience only; it shall not be construed as limited to these embodiments.

The layer containing the pigment will contain at least 5 wt %, preferably at least 10 wt %, especially at least 15 wt % of pigment, most preferably more than 20 wt % of pigment, while the layer substantially devoid of pigment will contain less than 1 wt %, and is preferably without pigment.

Upper limits for the content of pigment can be less than 50 wt % of pigment, preferably less than 40 wt % of pigment.

Thus, ranges for the pigment content are, e.g. 15–50 wt %, preferably 20–40 wt %.

Conventional additives may be incorporated in the layers of the instant films, in conventional amounts. Examples thereof are anti-oxidant, anti-UV agents, etc. Mixtures are also possible.

The instant film formed of the various layers can be of various structures and the polyester used can vary from one layer to another. For example, the inner pigment-free layer and/or the outer pigmented layer(s) can be obtained from starting products containing scrap material, allowing recycling. For example, the inner layer can contain scrap material, while the pigmented layers do not. The inner layer may even contain scrap material of the final film of the invention, provided the content of pigment is less than 1 wt %. Content of scrap is variable within broad limits known to the skilled man. One pigmented layer can be mat while the other is glossy. Also, the polyester can have a different nature from one layer to another, or they can be the same. All layers can be comprised of crystalline polyester, or all layer can be comprised of amorphous copolyester, or one layer can be crystalline and the other(s) can be amorphous. Especially, the invention provides films where the inner layer is crystalline (i.e. PET) while one or two of the outer layer(s) is amorphous (i.e. copolyester). This allows to combine specific mechanical properties of crystalline polyester and adhesive properties of the copolyester. It can also be forseen that each layer may be formed of two or more sub-layers; e.g. the outer pigmented layer can be formed of one sub-layer of PET and one sub-layer of copoyester, the first one being in contact with the inner layer.

The instant films can be used as individual layers in further multi-layers films. When necessary, a binder known to the skilled man can be used to incorporate the instant films into a further multi-layers arrangement.

The thickness of each layer can vary within broad limits, for example between 1 and 200 µm, preferably between 2 and 50 µm. One specific embodiment is the film where the layer substantially devoid of pigment represents the major part of the PET thickness; especially the ratio [thickness PET]/[thickness PET+TiO$_2$] can be comprised between 1 and 10, preferably 2 and 5.

The invention also provides a process for making the instant films, where the layers are coextruded. Coextrusion operative conditions are within the general knowledge of the skilled man. Other processes such as lamination, calendering, etc. can also be contemplated.

One preferred process makes use of a master-batch, where the pigment represents, e.g. 50 wt %. The pellets or chips of said master-batch are then mixed with pure polyester pellets or chips and fed into the extruder. The master-batch can also be mixed with chips of recycled (coextruded) films, thus possibly already containing a small amount of pigment. This allows to have a very uniform dispersion of the pigment in the polyester, which would otherwise not be obtainable by direct feeding of the pigment into the extruder.

The following examples are provided for illustrative purposes only and shall not be considered as limiting the scope of the invention.

COMPARATIVE EXAMPLES

Comparative Example 1

A resin composition consisting of 95 wt % of PET and 5 wt % of anataze-type titianium oxide was melt extruded at 280° C. by a twin-screw extruder through a T shaped die and cooled down on a chill-roll, which was water-cooled at 30° C. Then, the non-drawn sheet was stretched at 80° C. by a roll stretching machine at a draw ratio of 3.4 in the MD and then at 130° C. by a tenter at a draw ratio of 3.8 in the TD, and fixed at 230° C. by heat while relaxing the sheet at a rate of 4%. The resulting film was 20 µm thick with the average particle size of the fine titanium oxide particles being less than 0.5 µm.

Comparative Example 2

A 20 µm film was obtained by the same procedure as in comparative example 1 except that a resin composition consisting of 92.5 wt % of PET and 7.5 wt % of anataze-type tinanium oxide is used.

Comparative Example 3

A 20 µm film was obtained by the same procedure as in comparative example 1 except that a resin composition consisting of 90 wt % of PET and 10 wt % of anataze-type tinanium oxide is used.

Comparative Example 4

A 20 µm film was obtained by the same procedure as in comparative example 1 except that a resin composition consisting of 86 wt % of PET and 14 wt % of anataze-type tinanium oxide is used.

Comparative Example 5

A 40 µm film was obtained by the same procedure as in comparative example 1 except that a resin composition consisting of 95 wt % of PET and 5 wt % of anataze-type tinanium oxide is used.

Comparative Example 6

A 40 µm film was obtained by the same procedure as in comparative example 1 except that a resin composition consisting of 91 wt % of PET and 9 wt % of anataze-type tinanium oxide is used.

Comparative Example 7

A 12 µm film was obtained by the same procedure as in comparative example 1 except that a resin composition consisting of 95 wt % of PET and 5 wt % of anataze-type tinanium oxide is used.

Comparative Example 8

A 12 µm film was obtained by the same procedure as in comparative example 1 except that a resin composition consisting of 90 wt % of PET and 10 wt % of anataze-type tinanium oxide is used.

WORKING EXAMPLES

Example 1

A resin I composition consisting of 95 wt % of PET and 5 wt % of anataze-type titianium oxide and a resin II composition consisting of 100 wt % of PET are melt extruded at 280° C. in two twin-screw extruders through a coestrusion-feedblock in such a way that resin I is separated in two melt streams to form a sandwich structure with resin II as the inner layer. The three layers cast is cooled down on a chill-roll, which was water-cooled at 30° C. Then, the non-drawn 3 layers cast is stretched as in the comparative examples. The resulting film is 15 μm thick with a thickness distribution [PET/TiO$_2$]/PET[PET/TiO$_2$] of 3.5/8/3.5. The overall ratio [thickness PET]/[thickness PET+TiO$_2$] is 1.14 and the overall TiO$_2$ content is the 3 layers film is 2.33 wt %.

Example 2

A 15 μm coextruded white film was mobtained by the same procedure as in example 1 except that the composition of resin I was 93% by weight of polyethylene terephthalate and 7% by weight anataze-type TiO$_2$. The overall ratio [thickness PET]/[thickness PET+TiO$_2$] is 1.14 and the overall TiO$_2$ content in the 3 layer film is 3.27 wt %.

Example 3

A 15 μm coextruded white film was obtained by the same procedure as in Example 1 except that the composition of resin I was 91% by weight of polyethylene terephthalate and 9% by weight anataze-type TiO$_2$. The overall ratio [thickness PET]/[thickness PET+TiO$_2$] is 1.14 and the overall TiO$_2$ content in the 3 layer film is 4.2 wt %.

Example 4

A 15 μm coextruded white film was obtained by the same procedure as in Example 1 except that the composition of resin I was 89% by weight of polyethylene terephthalate and 11% by weight anataze-type TiO$_2$. The overall ratio [thickness PET]/[thickness PET+TiO$_2$] is 1.14 and the overall TiO$_2$ content in the 3 layer film is 5.13 wt %.

Example 5

A 15 μm coextruded white film was obtained by the same procedure as in Exazmple 1 except that the composition of resin I was 86% by weight of polyethylene terephthalate and 14% by weight anataze-type TiO$_2$. The overall ratio [thickness PET]/[thickness PET+TiO$_2$] is 1.14 and the overall TiO$_2$ content in the 3 layer film is 12.25 wt %.

Example 6

A 16 μm coextruded white film was obtained by the same procedure as in Example 1 except that the composition of resin I was 81% by weight of polyethylene terephthalate and 19% by weight anataze-type TiO$_2$. The thickness ratio [PET-TiO$_2$]/PET/[PET-TiO$_2$] was 2 μM/12 μm/2 μm. The overall ratio [thickness PET]/(thickness PET+TiO$_2$] is 3 and the overall TiO$_2$ content in the 3 layer film is 4.75 wt %.

Example 7

A 15 μm coextruded white film was obtained by the same procedure as in Example 1 except that the composition of resin I was 74% by weight of polyethylene terephthalate and 26% by weight anataze-type TiO$_2$. The thickness ratio [PET-TiO$_2$]/PET/[PET-TiO$_2$] was 2 μm/11 μm/2 μm. The overall ratio [thickness PET]/[thickness PET+TiO$_2$] is 2.75 and the overall TiO$_2$ content in the 3 layer film is 6.93 wt %.

Example 8

A 20 μm coextruded white film was obtained by the same procedure as in Example 1 except that the composition of resin I was 75% by weight of polyethylene terephthalate and 25% by weight anataze-type TiO$_2$. The thickness ratio [PET-TiO$_2$]/PET/[PET-TiO$_2$] was 2 μm/16 μm/2 μm. The overall ratio [thickness PET]/[thickness PET+TiO$_2$] is 4 and the overall TiO$_2$ content in the 3 layer film is 5 wt %.

Example 9

A 20 μm coextruded white film was obtained by the same procedure as in Example 1 except that the composition of resin I was 86% by weight of polyethylene terephthalate and 14% by weight anataze-type TiO$_2$. The thickness ratio [PET-TiO$_2$]/PET/[PET-TiO$_2$] was 3.5 μm/13 μm/3.5 μm. The overall ratio [thickness PET]/[thickness PET+TiO$_2$] is 1.86 and the overall TiO$_2$ content in the 3 layer film is 4.9 wt %.

Example 10

A 40 μm coextruded white film was obtained by the same procedure as in Example 1 except that the composition of resin I was 86% by weight of polyethylene terephthalate and 14% by weight anataze-type TiO$_2$. The thickness ratio [PET-TiO$_2$]/PET/[PET-TiO$_2$] was 3.5 μm/33 μm/3.5 μm. The overall ratio [thickness PET]/[thickness PET+TiO$_2$] is 4.71 and the overall TiO$_2$ content in the 3 layer film is 2.45 wt %.

Example 11

A 40 μm coextruded white film was obtained by the same procedure as in Example 1 except that the composition of resin I was 85% by weight of polyethylene terephthalate and 15% by weight anataze-type TiO$_2$. The thickness ratio [PET-TiO$_2$]/PET/[PET-TiO$_2$] was 5 μm/30 μm/5 μm. The overall ratio [thickness PET]/[thickness PET+TiO$_2$ ] is 3 and the overall TiO$_2$ content in the 3 layer film is 3.75 wt %.

Example 12

A 20 μm coextruded white film was obtained by the same procedure as in Example 1 except that the composition of resin I was 86% by weight of polyethylene terephthalate and 14% by weight anataze-type TiO$_2$. The thickness ratio [PET-TiO$_2$]/PET/[PET-TiO$_2$] was 5 μm/10 μm/5 μm. The overall ratio [thickness PET]/[thickness PET+TiO$_2$ ] is 1 and the overall TiO$_2$ content in the 3 layer film is 7 wt %.

The following properties were measured on some films of comparative examples and some films of working examples.

(1) Opacity

Opacity is the hiding power of a non-transparent material. It was measured with a Hunterlab Colorquest spectrophotometer in reflection mode using illuminant III VC (wavelength 400 to 680 nm). A black and white reference was taken to determine the opacity given in percent. A completely transparent film is equal to 0% opacity.

(2) Whiteness Index

Whiteness index is associated with a region or volume in the color space in which objects are recognized as white. The degree of whiteness is measured by the degree of departure from a perfect white (ideal white is bluish). It was measured with a Hunterlab Colorquest spectrophotometer in transmission mode using illuminant III C.

(3) Isothermal Shrinkage

The size of a 5×5 inch sample was measured before and after heat treatment in an oven at different temperatures, namely 150° C. and 200° C. The difference in size is measured and expressed in %, expressing stability.

(4) Mechanical Properties

Modulus, tensile strengh, force at 3% elongation (F3), force at 5% elongation (F5) and elongation at break were determined with an Instron equipment at room temperature.

Tables 1 and 2 give the data for the comparative examples and the working examples, respectively, where Th is thickness, Thcoex is thickness of pigmented layer, Coex- TiO$_2$% is the % of TiO$_2$ in the pigmented layer, total TiO$_2$% is the % of TiO$_2$ in the film. Table 3 gives mechanical data for films of comparative examples 1 and 2 and working examples 7 and 8.

TABLE 1

| Comp. Ex. | Th (μm) | TiO2 (%) | Opacity % | Whiteness index | DS 150 (%) | DS 200 (%) |
|---|---|---|---|---|---|---|
| 1 | 20 | 5 | 57.70 | — | 2.2 | 8.2 |
| 2 | 20 | 7.5 | 64.50 | 27.3 | 2.8 | 9.2 |
| 3 | 20 | 10 | 71.7 | 16.5 | 2.8 | 9.2 |
| 4 | 20 | 14 | 82.2 | — | 2.4 | 8.4 |
| 5 | 40 | 5 | 66.7 | — | 3.2 | 10.2 |
| 6 | 40 | 9 | 81.5 | — | 3.0 | 9.4 |
| 7 | 12 | 5 | 49.6 | — | — | — |
| 8 | 12 | 10 | 66.0 | — | 3.6 | 10.6 |

TABLE 2

| Example | Th (μm) | Thcoex (μm) | Coex TiO2 % | Total TiO2 % | Opacity % | Whiteness index | DS 150 (%) | DS 200 (%) |
|---|---|---|---|---|---|---|---|---|
| 1 | 15 | 3.5 | 5 | 2.3 | 39.30 | — | 2.0 | 8.0 |
| 2 | 15 | 3.5 | 7 | 3.3 | 47.7 | — | 2.0 | 7.2 |
| 3 | 15 | 3.5 | 9 | 4.2 | 51.4 | — | 1.8 | 6.8 |
| 4 | 15 | 3.5 | 11 | 5.1 | 56.8 | — | 1.8 | 6.6 |
| 5 | 15 | 3.5 | 14 | 12.3 | 61.6 | — | 1.6 | 6.2 |
| 6 | 16 | 3.5 | 19 | 4.8 | 72.9 | 20.0 | 1.6 | 6.0 |
| 7 | 15 | 2 | 26 | 6.9 | 65.0 | — | 1.8 | 6.6 |
| 8 | 20 | 2 | 25 | 5 | 66.10 | — | 1.8 | 6.8 |
| 9 | 20 | 3.5 | 14 | 4.9 | 64.0 | 29.8 | 1.4 | 6.0 |
| 10 | 40 | 3.5 | 14 | 2.5 | 61.8 | — | 2.6 | 8.4 |
| 11 | 40 | 5 | 15 | 3.8 | 66.9 | — | 2.2 | 8.8 |
| 12 | 20 | 5 | 14 | 7 | 69.0 | — | 1.2 | 6.6 |

TABLE 3

| | | Ex. 7 | Comp. ex. 2 | Ex. 8 | Comp. ex. 1 |
|---|---|---|---|---|---|
| Thickness (μm) | | 15 | 20 | 20 | 20 |
| TiO$_2$ (%) | | 6.9 | 7.5 | 5 | 5 |
| total coex | | 26 | 7.5 | 25 | 5 |
| Opacity | | 65 | 64 | 66 | 57 |
| Modulus (Mpa) | MD | 3669 | 3865 | 4370 | 4069 |
| | TD | 4992 | 4580 | 4832 | 4325 |
| F3 (N/mm$^2$) | MD | 84 | 87 | 90 | 88 |
| | TD | 93 | 93 | 94 | 89 |
| F5 (N/mm$^2$) | MD | 99 | 101 | 103 | 105 |
| | TD | 103 | 104 | 103 | 99 |
| Tensile (N/mm$^2$) | MD | 184 | 201 | 236 | 215 |
| | TD | 258 | 224 | 262 | 221 |
| Elong. (N/mm$^2$) | MD | 138 | 113 | 117 | 111 |
| | TD | 259 | 224 | 262 | 221 |

By comparing tables 1 and 2, it is possible to conclude the following:

for a given total TiO$_2$ content and thickness, opacity is higher for the coextruded 3 layer films than for the completely filled monolayer films.

for a given opacity, the whiteness index is higher for the films of the invention than for the completely filled monolayer films, evidencing that the coextruded films need less pigment.

for a given opacity, the isothermal shrinkage of the coextruded films is lower than that of the monolayer film, evidencing that the films of the invention are more stable.

By analyzing the content of table 3, it is possible to conclude that all mechanical values obtained for the coextruded 3 layers films are higher than those obtained for the monolayer film, evidencing superiority of the instant films.

The present invention is not limited by the embodiments described above but shall be construed in accordance with the appended claims.

what is claimed is:

1. A film comprising:
   (i) at least one crystalline polyester layer containing more than 5 wt % of a pigment wherein the pigment is selected from the group and consists essentially of white pigment, voided pigment, TiO$_2$, SiO$_2$, CaCO$_3$, Al$_2$O$_3$, BaSO$_4$, carbon black, zeolite, kaolin and mixtures thereof, and
   (ii) at least one crystalline polyester layer devoid of pigment,
   where the ratio of the respective thickness of the layer devoid of pigment to the pigmented layer is at least 1 and
   where the pigment has a particle size comprised between 0.02 and 1.0 μm.

2. The film of claim 1 comprising two outer layers containing pigment and one inner layer devoid of pigment.

3. The film according to claim 1 wherein the ratio is between 1 and 10.

4. The film according to claim 1, wherein the at least one layer containing a pigment contains more than 10 wt % of pigment.

5. The film according to claim 1, wherein the at least one layer containing a pigment contains less than 50 wt % of pigment.

6. The film according to claim 1, wherein each layer has a thickness in a range of between 1 μm and 200 μm.

7. The film according to claim 1, wherein the pigment has a particle size in a range of between 0.01 μm and 5 μm.

8. The film according to claim 1, wherein the layers are coextruded layers.

9. The film according to claim 1, wherein the pigment is titanium dioxide.

10. The film according to claim 1, wherein the polyester is PET.

11. A process for making the film of claim 1 comprising the step of coextruding said layers.

12. The film according to claim 3 where the ratio is between 2 and 5.

13. The film according to claim 2 where the ratio is between 1 and 10.

14. The film according to claim 13 wherein the ratio is between 2 and 5.

15. The film according to claim 4, wherein the pigment is present in an amount of greater than 15 wt %.

16. The film according to claim 15, wherein the pigment is present in an amount of greater than 20 wt %.

17. The film according to claim 5, wherein the at least one layer containing a pigment contains less than 40 wt % of pigment.

18. The film according to claim 6, wherein each layer has a thickness in the range of between 2 μm and 50 μm.

19. The film according to claim 7, wherein the pigment has a particle size in the range of between 0.02 μm and 1.0 μm.

20. The film according to claim 2, wherein the layers are coextruded layers.

21. The film according to claim 2, wherein the pigment is titanium dioxide.

22. The film according to claim 2, wherein the polyester is PET.

23. A process for making the film of claim 2, comprising the step of coextruding said layers.

24. A process for making the film of claim 3, comprising the step of coextruding said layers.

25. A process for making the film of claim 13, comprising the step of coextruding said layers.

26. The film of claim 1 wherein the pigment is selected from the group and consists essentially of $TiO_2$, $SiO_2$, $CaCO_3$, $Al_2O_3$, $BaSO_4$, carbon black, zeolite and mixtures thereof.

* * * * *